Nov. 12, 1940.    R. SENSAUD DE LAVAUD    2,221,613
PROPELLER HAVING AN AUTOMATICALLY VARIABLE PITCH
Filed Dec. 27, 1937    2 Sheets-Sheet 1
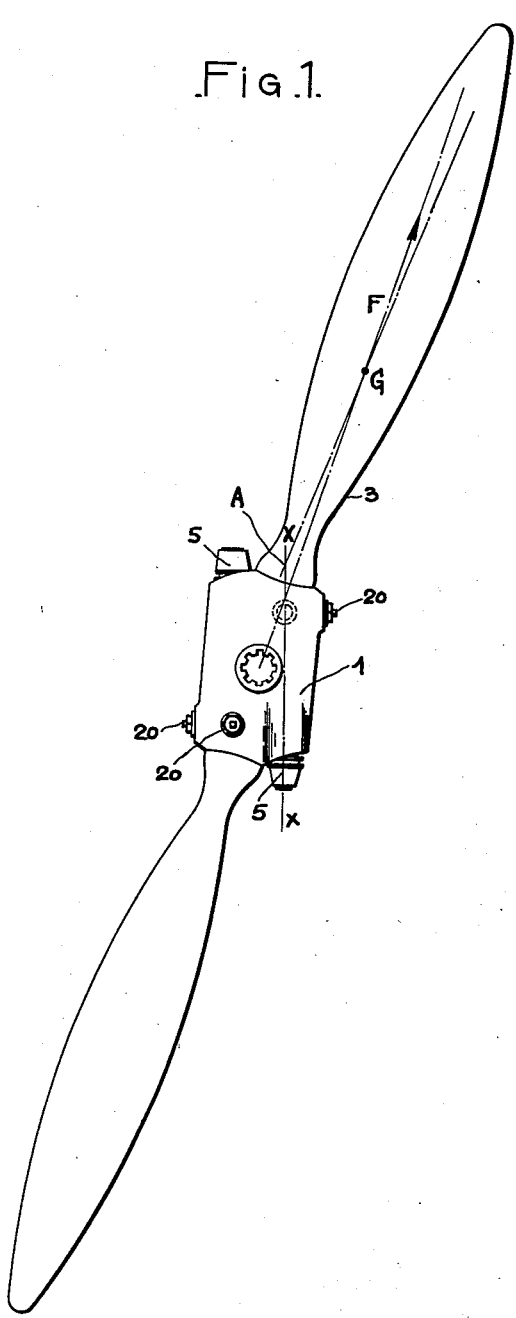
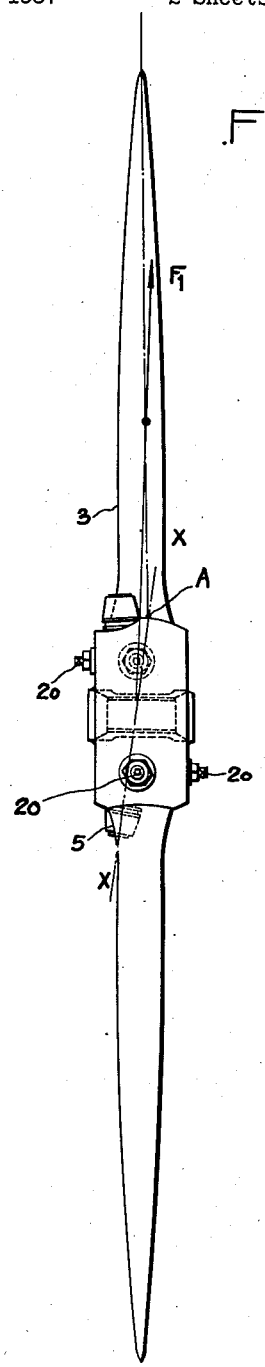
INVENTOR:
ROBERT SENSAUD DE LAVAUD
BY Haseltine, Lake & Co.
ATTORNEYS Nov. 12, 1940.   R. SENSAUD DE LAVAUD   2,221,613
PROPELLER HAVING AN AUTOMATICALLY VARIABLE PITCH
Filed Dec. 27, 1937   2 Sheets-Sheet 2
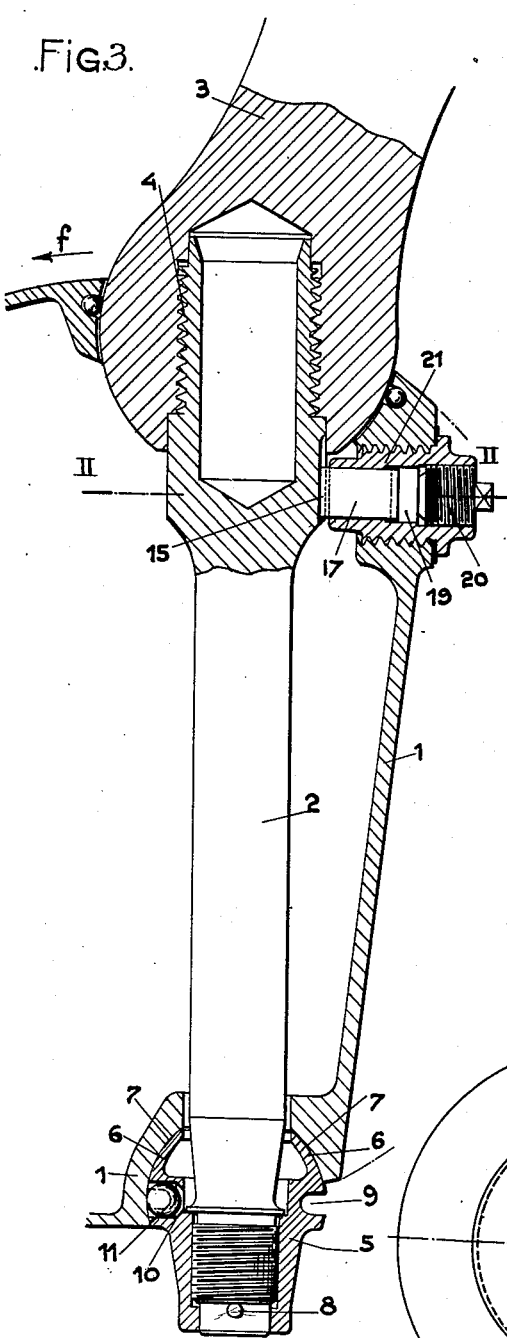
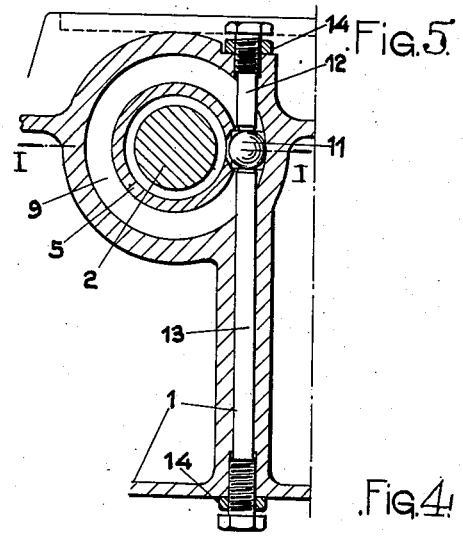
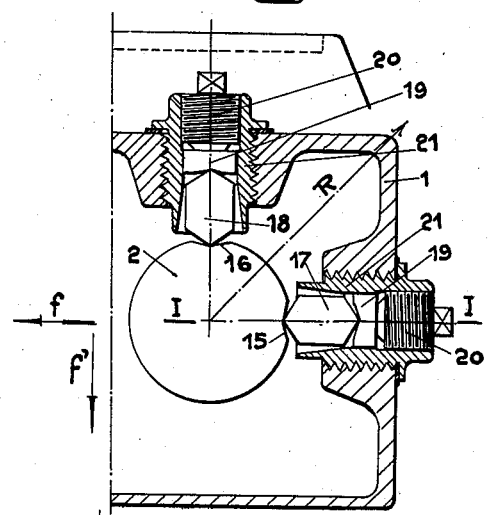
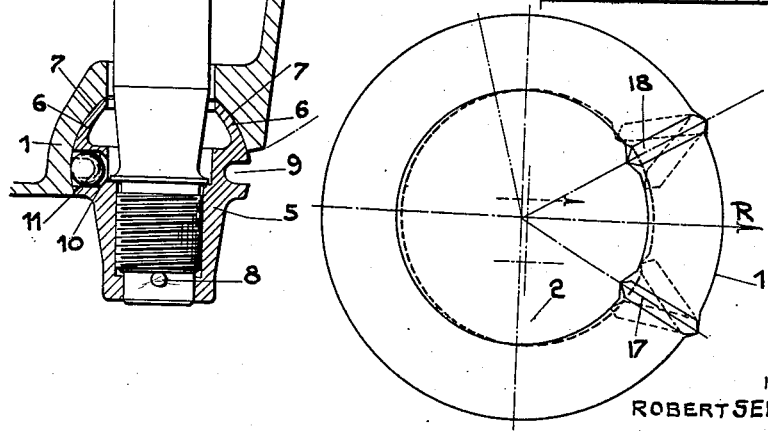
INVENTOR
ROBERT SENSAUD DE LAVAUD
By: Haseltine, Lake & Co.
ATTORNEYS Patented Nov. 12, 1940

2,221,613

UNITED STATES PATENT OFFICE 2,221,613

PROPELLER HAVING AN AUTOMATICALLY VARIABLE PITCH

Robert Sensaud de Lavaud, Paris, France

Application December 27, 1937, Serial No. 181,801
In France December 28, 1936

3 Claims. (Cl. 170—164)

The present invention relates to improvements in propellers having an automatically variable pitch of the type in which each blade pivots relatively to the hub and, during the adjustment of the pitch, about a geometrical axis inclined relatively to the neutral axis of the blade, in such a manner that the neutral axis of each blade describes a cone in space during the adjustment. This geometrical axis is situated in a plane parallel to the axis of rotation of the hub and forwardly inclined.

It is known that, in actually existing propellers of this type, and for example in the propeller shown and described in United States Patent No. 1,943,210, patented January 9, 1934, equilibrium is obtained at every instant between the following torques:

(a) An aerodynamic torque tending to reduce the pitch. This torque results from the aerodynamic thrust applied to the thrust center of the blade.

(b) A resilient torque tending to reduce or to increase the pitch according as the blades are located on one side or the other of their neutral position.

(c) A centrifugal torque which tends to increase the pitch, this centrifugal torque being substantially greater than the aerodynamic torque. This torque results from the mass of the blade applied to the center of gravity of the said blade.

(d) A supplementary centrifugal torque, created by centrifugal masses or bodies, or the like, kinematically connected by any suitable means to the roots of the blades, tending to accentuate a pivotal movement which has started, that is to say tending to increase the pitch when the blade pivots toward increased pitch and reversely.

The present invention has for object automatic means adapted to create a torque replacing this supplementary centrifugal torque without using centrifugal masses or bodies or the like, the operation of which is always delicate; and, for that purpose, it is characterised by the fact that use is made of the lateral thrust of the blade on the hub, which thrust due to centrifugal torque exerted on the blades and to the inclination of the latter relative to their root, is converted into a pivoting movement of the said blades by the action of supporting wedges taking a bearing, on the one hand, on the hub and, on the other hand, on the root of the blade, these wedges being in unstable equilibrium when the blade is at rest.

The present invention also includes a number of particular points which will appear from the following description with reference to the accompanying drawings disclosing the invention by way of example only, in which drawings:

Figure 1 is a front end view of a propeller according to the invention,

Figure 2 is a corresponding side view.

Fig. 3 is a section made substantially at right angles to the axis of rotation of the hub, through the axis of the root or torsion rod of a propeller blade as taken on line I—I in Figs. 4 and 5.

Fig. 4 is a section taken on line II—II in Fig. 3 showing the supporting wedges.

Fig. 5 is a section taken on line III—III in Fig. 3 showing the device for adjusting the end of the torsion rod.

Fig. 6 is a diagram showing the action of the supporting wedges.

In Fig. 1 there is shown only a blade root with its torsion rod but it is intended that the propeller shall include two blades arranged symmetrically relatively to a point situated upon the axis of rotation of the hub. In Fig. 1, this axis is at the left of the torsion rod of the blade shown.

On the hub 1 of the propeller are mounted the roots 2 of the blades 3 of said propeller. These roots 2, which in known manner form torsion rods, have any desired cross section and are rigidly connected at one of their ends to the corresponding blade 3 by any suitable means. It is thus seen that, in the form of construction illustrated, the end of the torsion rod 2 is screw threaded at 4 and forcibly screwed in hot condition and into a corresponding internal screw thread of blade 3. The other end of the torsion rod 2 is secured on the hub 1 by any suitable means. In order to allow an initial adjustment of the position of the blade, this torsion rod 2 is adjustably secured on said hub 1.

For that purpose, the end of the torsion rod 2 is rendered rigid, by screwing on the same for instance, a nut 5, the internal portion 6 of which is spherical so as to form a spherical member engaged in a recess 7 of corresponding shape formed in the hub 1; while a pin 8 or the like prevents the nut 5 from being unscrewed.

This nut 5 has a groove 9 in the axis of which is formed a blind recess 10 in which a ball 11 or the like engages. This ball 11 is locked and held in position by the ends of two screw threaded rods or screws 12 and 13 having substantially the same axis and screwed into the hub 1 or into a transverse wall of the latter. It will be understood that, by screwing and unscrewing the screws 12 and 13, any desired adjustment of the rest position of the torsion rods 2, and consequently of the blades 3, can be obtained, these screws 12 and 13 being capable of being locked in position by any suitable means such as, for instance by lock-nuts 14.

At its other end, each torsion rod 2 has two notches or cut-away portions 15 and 16 in the shape of a very open V, the edge of the V being substantially parallel to the axis of this torsion rod 2 and these two notches 15 and 16 being located, relative to the rod 2, as indicated hereinafter. On the bottom of these notches 15 and 16 respectively bear the ends, also of V shape, of two supporting wedges 17 and 18, the other V-shaped ends of which bear against thrust-plates 19. These thrust-plates 19 are adjustable in axial position by means of screws 20 screwed into sockets 21, which are themselves screwed into corresponding internal screw threaded portions of the hub 1. The notches 15 and 16 and the corresponding wedges 17 and 18 are so arranged that the lateral reaction component R exerted by the root of the blade on the hub 1 under the effect of the centrifugal torque on this blade, substantially forms a bisecting line of the angle comprised between the bearing points of the wedges 17 and 18 on the hub 1.

Figures 1 and 2 show how centrifugal action upon a blade produces the lateral reaction R. The axis of the rod 2 which corresponds to a blade 3 is shown at X—X. The neutral axis of the blade encounters the axis X—X at A, and the centrifugal force exerted upon the blade at the center of gravity G of the blade is shown at F and $F_1$. It is easily understood that owing to the position of the center of gravity G of the blade relatively to the axis X—X, F—$F_1$ gives the lateral reaction R.

The operation is as follows:

When the propeller rotates and owing to the inclination of the blades and of their torsion rods 2, the centrifugal torque exerted on the blades creates, at the end of the torsion rod 2 which is connected to the blade 3, a component R located in a plane tangent to the hub and which is directed rearwardly relative to the direction of rotation $f$ of the airscrew and rearwardly relatively to the direction of axial advance $f'$. This component R' tends to bend the axis of the torsion rod 2 according to its direction, which axis substantially forms the mentioned bisecting line of the angle formed by the supporting wedges 17 and 18. As soon as a pivotal movement of the blade 3 starts, the wedges 17 and 18 are inclined relative to their initial position in which they were situated in planes passing through the geometrical axis of the torsion rod 2. The lateral thrust applied upon the said rod then acts to increase the inclination of the wedge and consequently to increase the rotation of the blade.

What I claim as my invention and desire to secure by Letters Patent is:

1. In a variable pitch propeller of the kind in which each blade is fastened to the end of a torsion rod carried by the hub and inclined relative to the neutral axis of the blade and to the axis of the hub, means for rigidly securing to the hub the end of the torsion rod opposed to the root of the blade, two wedges interposed between the said rod and the hub and placed, when the blade is at rest, in planes passing through the geometrical axis of the torsion rod for increasing the torsional movement of the said rod by the action of lateral thrust applied upon the rod under the effect of the centrifugal torque upon the blade.

2. In a variable pitch propeller according to claim 1, two wedges interposed between the torsion rod and the hub and arranged in planes passing through the geometrical axis of the said rod and equidistant of the plane into which is directed the lateral thrust resulting from the centrifugal torque applied upon the blade.

3. In a variable pitch propeller of the kind in which each blade is fastened to the end of a torsion rod carried by the hub and inclined relatively to the neutral axis of the blade and to the axis of the hub, a nut fastened to the end of the torsion rod opposed to the root of the blade, a groove or radial recess in the said nut, a ball in the recess, screws screwed into the hub and passing through the groove for abutting the said ball and fastening the rod upon the hub, two wedges interposed between the said rod and the hub and placed, when the blade is at rest, in planes passing through the geometrical axis of the torsion rod for increasing the torsional movement of the said rod by the action of lateral thrust applied upon the rod under the effect of the centrifugal torque upon the blade.

ROBERT SENSAUD DE LAVAUD.